United States Patent [19]

Davis et al.

[11] Patent Number: 4,991,547
[45] Date of Patent: Feb. 12, 1991

[54] INTAKE PORT PRESSURE CONTROL SYSTEM FOR ENGINE INDUCTION SYSTEM

[75] Inventors: Richard S. Davis, Romeo; Glen R. MacFarlane, Clarkston; Ko-Jen Wu, Troy, all of Mich.

[73] Assignee: General Motors Corporation, Detroit, Mich.

[21] Appl. No.: 534,986

[22] Filed: Jun. 8, 1990

[51] Int. Cl.⁵ ............................................. F02M 35/10
[52] U.S. Cl. ................................. 123/52 MF; 123/568
[58] Field of Search ......... 123/52 M, 52 MV, 52 MB, 123/52 MC, 52 ML, 52 MF, 316, 568

[56] References Cited

U.S. PATENT DOCUMENTS

| | | | |
|---|---|---|---|
| 3,810,454 | 5/1974 | Hunt | 123/52 MF |
| 3,937,194 | 2/1976 | Tamaki et al. | 123/568 |
| 3,995,609 | 12/1976 | Klomp | 123/188 S |
| 4,232,641 | 11/1980 | Curtil | 123/316 |
| 4,356,798 | 11/1982 | Sakaoka et al. | 123/52 MF |
| 4,409,949 | 10/1983 | Tanaka et al. | 123/571 |
| 4,422,416 | 12/1983 | Bernardoni | 123/52 MF |
| 4,512,152 | 4/1985 | Asaba | 60/601 |
| 4,517,947 | 5/1985 | Nishikawa et al. | 123/52 MF |
| 4,538,555 | 9/1985 | Kite | 123/52 MB |
| 4,760,703 | 8/1988 | Minami et al. | 60/605.1 |
| 4,773,358 | 9/1988 | Heath | 123/52 MF |
| 4,928,639 | 5/1990 | Schatz | 123/52 MF |

FOREIGN PATENT DOCUMENTS 0889878 12/1981 U.S.S.R.

OTHER PUBLICATIONS

"1900 Corvette Service Manual", General Motors Corporation, 1/90, Driveability and Emissions 5.7L (VIN 8), pp. 6E3-C3-1-6E3-C3-4.
"Alfa Romeo", Automotive Engineering, vol. 96, No. 11, Nov. 1988, pp. 109-110.
"Improving the Torque Characteristic of a Small Four Stroke Four Cylinder Engine by Using Reed Valves in the Intake Manifold", SAE Technical Paper Series 890222, 3/1989.
"The Effects of Load Control with Port Throttling at Idle-Measurements and Analyses", SAE Technical Paper Series 890679, 3/1989.
"A Stratified Charging Two-Stroke Engine for Reduction of Scavenged-Through Losses", SAE Technical Paper Series 891805, 9/1989.
"Reduction of Fresh Charge Losses by Selective Exhaust Gas Recirculation (SEGR) in Two-Stroke Engines", SAE Technical Paper Series 891806, 9/1989.

Primary Examiner—David A. Okonsky
Attorney, Agent, or Firm—Gordon F. Belcher

[57] ABSTRACT

An intake port pressure control system comprises an intake passage leading to a cylinder in an engine, and a check valve in the intake passage to allow fluid flow toward the cylinder and obstruct fluid back-flow in the reverse direction. A bypass port is located on the intake passage so that the bypass port communicates with a trapped volume defined by the portion of the intake passage between the check valve and intake valve. The intake port pressure control system further comprises a control valve having an outlet passage, a secondary passage, and an actuator enabling communication between the outlet passage and secondary passage. The actuator further enables active adjustment of the flow area of the flowpath between the secondary passage and outlet passage throughout a range of engine operating conditions. The outlet passage is connected to the bypass port, and the secondary passage is connected to a secondary air source. The control valve enables a controlled air flow therein between the secondary air source and the trapped volume when the intake valve is closed.

6 Claims, 4 Drawing Sheets

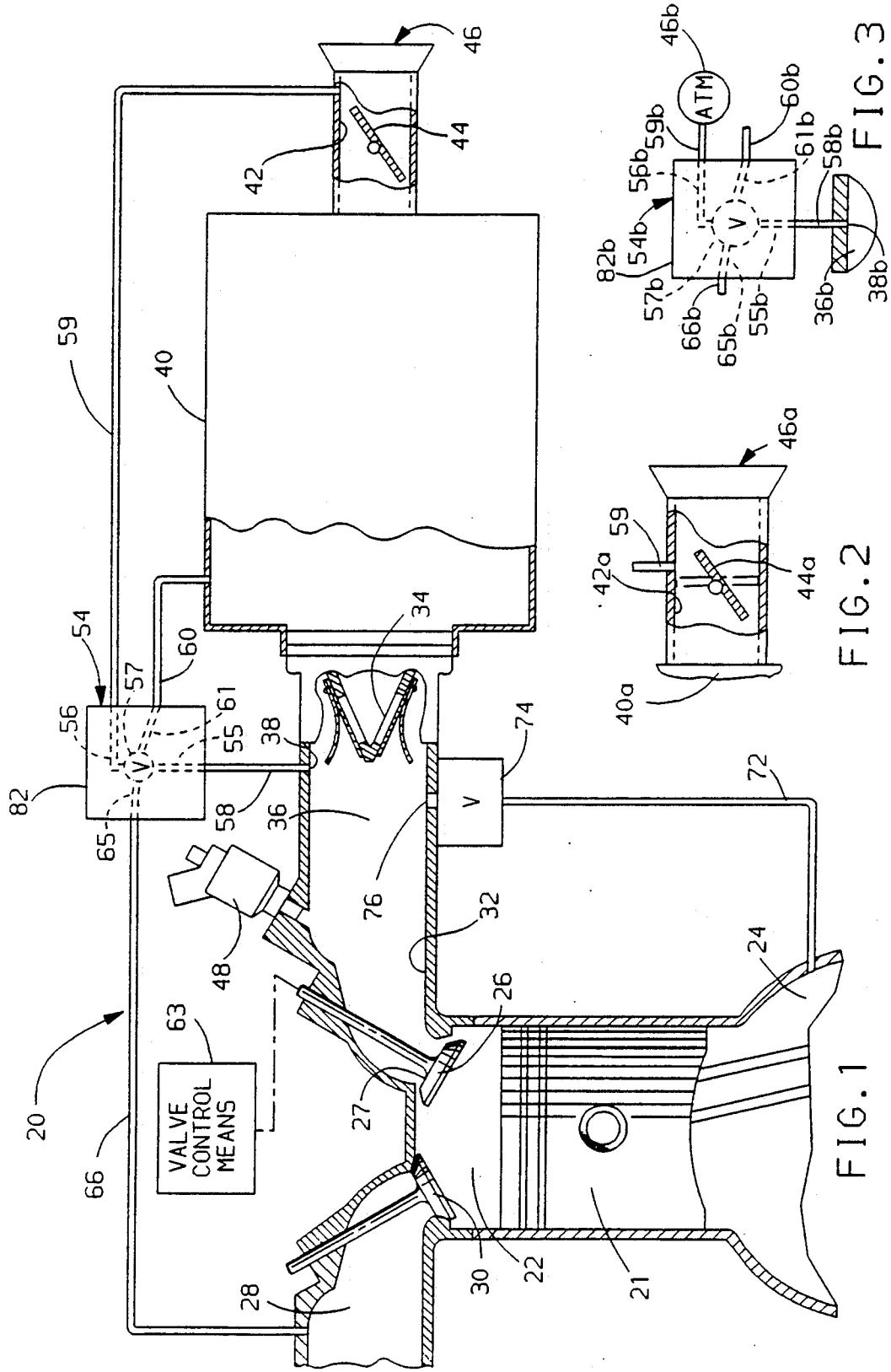

INTAKE PORT PRESSURE CONTROL SYSTEM FOR ENGINE INDUCTION SYSTEM

TECHNICAL FIELD

This invention relates to an intake port pressure control system for an engine induction system having a check valve in an intake passage leading to a cylinder in an engine and a control valve means connected to the intake passage downstream of the check valve to enable control of the pressure in the intake passage.

BACKGROUND

A check valve can be located in the intake passage of an engine leading to a cylinder to obstruct back-flow of fluid out of the cylinder into the intake passage. In such an arrangement, a trapped volume is defined by the portion of the intake passage between the check valve and an intake valve seated in the intake passage between the check valve and cylinder.

A port can be located on the intake passage so that the port communicates with the trapped volume, and a secondary passage can be connected to the port allowing a secondary air flow into the trapped volume increasing the pressure therein.

A control valve can be connected to the secondary passage to enable adjustment of its flow area. The ability of such a control valve to rapidly adjust the flow area of such a secondary passage appears, however, to be limited. This can limit improvements in engine performance produced by the secondary air flow, particularly if the operating condition of the engine changes rapidly since the optimum pressure in the trapped volume can vary depending on the operating condition of the engine. Improvements in engine performance during idle and light load operation can be particularly limited because of the sensitivity of the engine performance to trapped volume pressure during such operation.

A check valve can be located upstream of each cylinder of a multi-cylinder engine thereby defining a respective trapped volume for each cylinder. Such engines can include a secondary passage connected to each trapped volume for providing secondary air thereto. Such secondary passages can be supplied from a single duct having a control valve. The ability to rapidly and accurately adjust such a control valve appears, however, to be limited.

Moreover, the single duct allows unrestricted communication between secondary passages leading to trapped volumes being pressurized, and other secondary passages leading to cylinders into which air is flowing. The reduced pressures in the other secondary passages can cause pressure reductions in the secondary passages leading to the trapped volumes being pressurized thereby reducing the pressurization therein. The control valve in the duct can restrict the secondary air flow into the secondary passages reducing the effect of the secondary air flow in restoring the pressure therein.

SUMMARY OF THE INVENTION

The present invention provides an intake port pressure control system comprising an intake passage leading to a cylinder in an engine, and a check valve in the intake passage to allow fluid flow toward the cylinder and obstruct fluid back-flow in the reverse direction. An intake valve is seated in the intake passage between the check valve and cylinder. A bypass port is located on the intake passage so that the bypass port communicates with a trapped volume defined by the portion of the intake passage between the check valve and intake valve.

The intake port pressure control system further comprises a control valve means having an outlet passage, a secondary passage, and an actuating means enabling communication between the outlet passage and secondary passage. The actuating means further enables active adjustment of the flow area of the flowpath between the secondary passage and outlet passage throughout a range of engine operating conditions. The outlet passage is connected to the bypass port enabling communication between the outlet passage and trapped volume. The secondary passage is connected to a secondary air source enabling communication therebetween. The control valve enables a controlled air flow therein between the secondary air source and the trapped volume when the intake valve is closed.

The air flow from the secondary air source to the trapped volume, via the control valve means, enables the pressure in the trapped volume to be increased. Increasing the pressure in the trapped volume when the intake valve is closed (prior to the intake of air into the cylinder) can improve the performance of an engine having valve overlap (i.e., concurrent opening of the intake and exhaust valves of the cylinder). Valve overlap can facilitate discharge of exhaust gas residuals from the cylinder during some engine operating conditions, but can inhibit such discharge during other operating conditions. During these other operating conditions, the discharge can be facilitated by increasing the pressure in the trapped volume prior to the intake of air into the adjacent cylinder. Increasing the pressure in the trapped volume prior to the intake of air into the adjacent cylinder can also reduce the work of the engine required to draw air into the cylinder. The active adjustability of the flow area of the flowpath between the secondary passage and outlet passage enables control of the pressure increase in the trapped volume while the engine is operating. The optimum pressure in the trapped volume can thereby be maintained over a range of engine operating conditions.

On a multi-cylinder engine, the intake port pressure control system can include respective check valves located upstream of each cylinder thereby establishing a trapped volume leading to each cylinder. Each such trapped volume communicates with a secondary air source via a control valve means, in a similar fashion as with the single cylinder embodiment. The control valve means includes an actuating means which enables control of the flow area of each outlet passage enabling controlled increases in the pressure in the respective trapped volumes.

The control of the flow area of each outlet passage can also restrict communication between the outlet passages and the portion of the control valve means leading to the secondary air source. These restrictions can limit the pressure reduction in this portion of the control valve means which can occur if the intake of air into the cylinders occurs during different portions of the engine cycle.

These and other features and advantages of the invention will be more fully understood from the following description of certain specific embodiments of the invention taken together with the accompanying drawings.

BRIEF DRAWING DESCRIPTION

In the drawings:

FIG. 1 is a schematic view showing the intake port pressure control system of the present invention connected to an engine;

FIG. 2 is a schematic view of the throttle passage of FIG. 1, showing an alternative embodiment of the invention wherein the secondary passage extension is adjacent the throttle valve;

FIG. 3 is a schematic view of a portion of a control valve means, similar to that of FIG. 1, showing an alternative embodiment of the invention wherein the secondary passage extension is open to the ambient air;

Corresponding reference characters indicate corresponding parts throughout the several views of the drawings.

DETAILED DESCRIPTION

Figure 4:
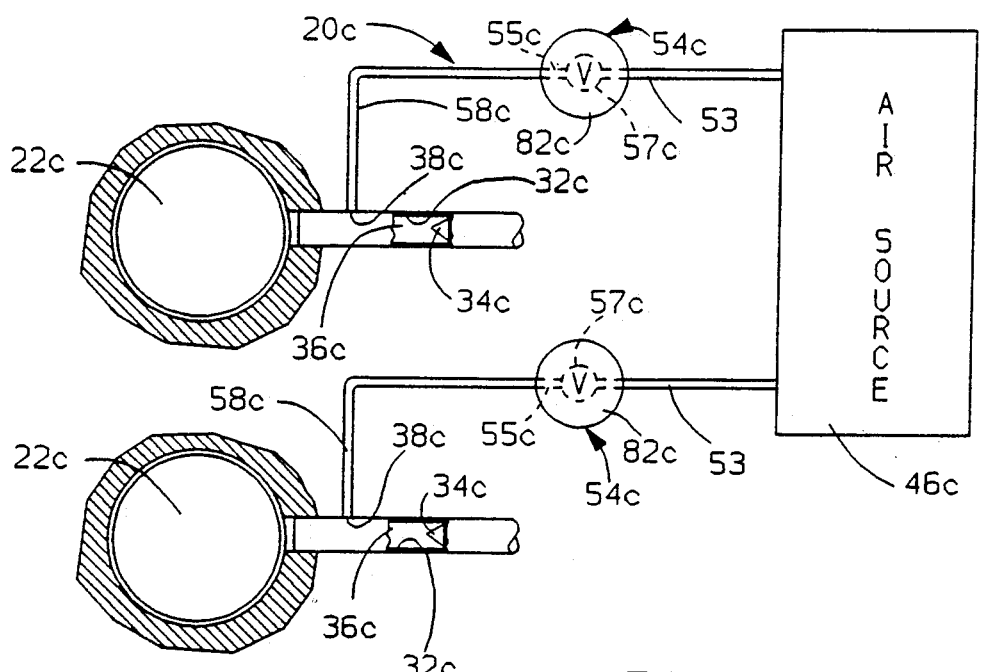
FIG. 4 is a schematic view of an alternative embodiment of the invention connected to a multi-cylinder engine.

Referring now to the drawings in detail, and in particular, FIG. 1, numeral 20 generally refers to an intake port pressure control system of the present invention connected to an engine. The intake port pressure control system 20 may be used with a four-stroke engine, supercharged engine, rotary valve engine or rotary engine.

The engine includes a piston 21 disposed in a cylinder 22, a crankcase 24 and an exhaust passage 28 leading away from the cylinder 22. An exhaust valve 30 is seated in the exhaust passage 28.

The intake port pressure control system 20 comprises an intake passage 32 leading to an intake port 27 of the cylinder, and a check valve 34, such as a reed valve, located in the intake passage 32. The check valve 34 allows fluid flow toward the cylinder 22 and obstructs fluid back-flow in the reverse direction. The check valve 34 can be replaced by a butterfly valve. An intake valve 26 is seated in the intake passage 32 between the check valve 34 and cylinder 22.

Additional intake passages having check valves or butterfly valves therein can communicate with the intake passage 32 between the check valve 34 and intake valve 26. Such additional intake passages can merge with the intake passage 32 or lead to separate intake ports in the cylinder 22. Any such additional intake passages leading to separate intake ports would have intake valves seated therein.

A bypass port 38 is located on the intake passage 32 so that the bypass port communicates with a trapped volume 36 defined by the portion of the intake passage 32 between the check valve 34 and intake valve 26. If additional intake passages having check valves or butterfly valves therein communicate with the intake passage 32 between the check valve 34 and intake valve 26, then the trapped volume is defined by the portions of each intake passage between the respective check valves or butterfly valves therein and any intake valves seated in the intake passages.

A plenum 40 is connected to the inlet of the intake passage 32 and a throttle passage 42 leads to the plenum. A throttle valve 44 is located in the throttle passage 42. The throttle valve 44 may also be located in the intake passage 32 between the plenum 40 and check valve 34.

A fuel injector 48 is preferably connected to the intake passage 32 to inject fuel into the trapped volume 36. Alternatively, the fuel injector 48 may be located upstream of the check valve 34. Other methods of supplying fuel to the cylinders, such as a carburetor, can also be used. For multi-cylinder engines, sequential port fuel injection is preferable.

The intake port pressure control system 20 further comprises a control valve means 54 having an outlet passage 55, a secondary passage 56, and an actuating means 57 enabling communication between the outlet passage and secondary passage. The actuating means 57 further enables active adjustment of the flow area of the flowpath between the secondary passage 56 and outlet passage 55 (i.e., controlled variations in the flow area of the flowpath while the engine is operating) throughout a range of engine operating conditions.

The control valve means 54 can include an outlet passage extension 58 connected between the outlet passage 55 and bypass port 38. The control valve means 54 does not require an outlet passage extension 58 since the outlet passage 55 can be connected directly to the bypass port 38. In either embodiment, the connections enable communication between the outlet passage 55 and trapped volume 36.

The control valve means 54 can include a secondary passage extension 59 connected between the secondary passage 56 and throttle passage 42. The secondary passage extension 59 is connected to the throttle passage 42 upstream of the throttle valve 44. The control valve means 54 does not require a secondary passage extension 59 since the secondary passage 56 can be connected directly to the throttle passage 42 upstream of the throttle valve 44. In either embodiment, the connections enable communication between the secondary passage 56 and throttle passage 42 upstream of the throttle valve 44. The pressure in this portion of the throttle passage 42 is approximately atmospheric, with this portion of the throttle passage constituting the secondary air source 46.

FIG. 2 is a schematic view of a throttle passage 42a, similar to the throttle passage 42 of FIG. 1, showing an alternative embodiment of the intake port pressure control system 20a. Parts similar to those shown in FIG. 1 have the same reference numeral with the addition of the suffix a. In this embodiment, the secondary passage extension 59a is connected to the throttle passage 42a adjacent the throttle valve 44a, and between the throttle valve and the inlet to the throttle passage. This portion of the throttle passage 42a thereby constitutes the secondary air source 46a.

The connection of the secondary passage extension 59a to the throttle passage 42a is located so that when the throttle valve 44a is closed, as shown by the broken lines in FIG. 2, the portion of the throttle passage with which the secondary passage extension communicates has generally the same pressure as the inlet to the throttle passage, which is generally atmospheric. The location of the connection also enables the throttle valve 44a to be set at a partial opening, as shown by the solid lines in FIG. 2, so that the pressure in the portion of the throttle passage 42a with which the secondary passage extension 59a communicates has generally the same pressure as the outlet of the throttle passage. The outlet of the throttle passage 42a has generally the same pressure as the plenum 40a since it is connected thereto. When the throttle valve 44a is fully opened, the pressure in the portion of the throttle passage 42a with which the secondary passage extension 59a communicates is generally the same as in the inlet to the throttle passage.

FIG. 3 is a schematic view of a portion of a control valve means 54b, similar to the control valve means 54 of FIG. 1, showing an alternative embodiment of the intake port pressure control system 20b. Parts similar to those shown in FIG. 1 have the same reference numeral with the addition of the suffix b. In this embodiment, the end of the secondary passage extension 59b opposite the secondary passage 56 is directly open to the ambient air with an air filter being interposed in the secondary passage extension. Communication between the ambient air, which constitutes the secondary air source 46b, and trapped volume 36b is thereby enabled.

An alternative embodiment of the intake port pressure control system 20c for use with a multi-cylinder engine is shown schematically in FIG. 4. Parts similar to those shown in FIG. 1 have the same reference numeral with the addition of the suffix c. The control valve means 54c includes a secondary passage means 53 which enables communication between the outlet passage 55c and secondary air source 46c. The actuating means 57c enables individual control of the flow area of each flowpath between the secondary passage means 53 and the outlet passages 55c.

The actuating means 57c can restrict communication between the outlet passages 55c and secondary passage means 53. This can limit any pressure reduction in the secondary passage means 53 during the intake of air into the cylinders 22c. Such pressure reductions in any branch of the secondary passage means 53 can cause a pressure reduction throughout the secondary passage means if the secondary air source 46c is sufficiently small. Such pressure reductions can also occur when some trapped volumes 36c are being pressurized if the intake of air into at least two of the cylinders 22c occurs during different periods of the engine cycle, as is typical in a multi-cylinder engine. This can limit the pressurization of the trapped volumes 36c.

In addition, the restriction between the outlet passage 55c and secondary passage means 53 does not affect the communication between the secondary passage means and secondary air source 46c. This enables the secondary air source 46c to influence the pressure in the secondary passage means 53 regardless of the size of the flow area of the flowpath between the secondary passage means 53 and the outlet passages 55c produced by the actuating means 57c.

Figure 5:
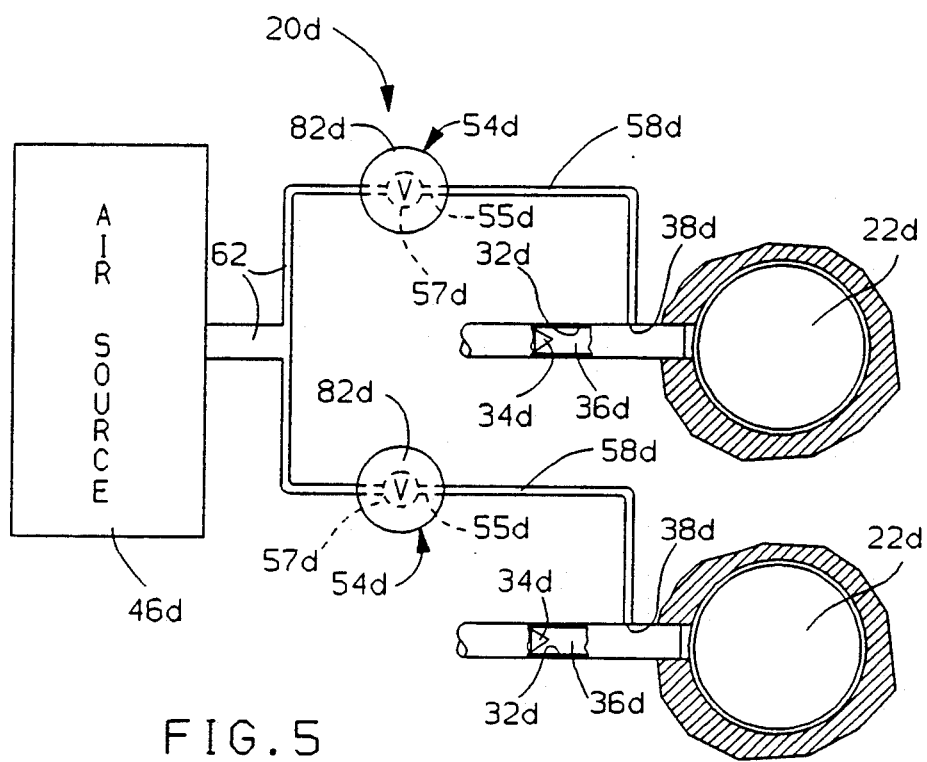
FIG. 5 is a schematic view of an alternative embodiment of the invention connected to a multi-cylinder engine.

An alternative embodiment of the intake port pressure control system 20d for use with a multi-cylinder engine is shown schematically in FIG. 5. Parts similar to those shown in FIG. 1 have the same reference numeral with the addition of the suffix d. A secondary passage means 62 allows communication between the outlet passages 55d and secondary air source 46d. This embodiment is similar to FIG. 4 except that the branches of the secondary passage means 62 join together between the actuating means 57d and secondary air source 46d. As with the embodiment depicted in FIG. 4, the actuating means 57d restricts communication between the outlet passage 55d and secondary passage means 62. This limits the pressure reduction in the secondary passage means 62 caused by pressure reductions in the outlet passages 55d. Also, the restriction between the outlet passages 55d and secondary passage means 62 does not affect the communication between the secondary passage means and secondary air source 46d.

While the intake port pressure control systems, 20, 20a-d, are sufficient to constitute the invention, additional components may be added, as will be described below.

Auxiliary Passages

As shown in FIG. 1, the intake port pressure control system 20 can be used with an auxiliary chamber, such as the plenum 40. The control valve means 54 has an auxiliary passage 61 which can communicate with the outlet passage 55 via the actuating means 57. The actuating means 57 also enables control of the flow area of the flowpath between the auxiliary passage 61 and outlet passage 55.

The control valve means 54 can include an auxiliary passage extension 60 connected between the auxiliary passage 61 and plenum 40. The control valve means 54 does not require an auxiliary passage extension 60 since the auxiliary passage 61 can be connected directly to the plenum 40. In either embodiment, the connections enable communication between the auxiliary passage 61 and plenum 40.

The plenum 40 and trapped volume 36 are thereby able to communicate via the control valve means 54. The plenum 40a and trapped volume 36a can also communicate via the throttle passage 42a and secondary passage extension 59a in the embodiment shown in FIG. 2 when the throttle valve 44a is at least partially open.

The intake port pressure control system 20 may also be used with an additional auxiliary chamber, such as the exhaust passage 28. The control valve means 54 can include an auxiliary passage 65 which can communicate with the outlet passage 55 via the actuating means 57. The actuating means 57 enables control of the flow area of the flowpath between the auxiliary passage 65 and outlet passage 55.

The control valve means 54 can include an auxiliary passage extension 66 connected between the auxiliary passage 65 and exhaust passage 28. The control valve means 54 does not require an auxiliary passage extension 66 since the auxiliary passage 65 can be connected directly to the exhaust passage 28. In either embodiment, the connections enable communication between the auxiliary passage 65 and exhaust passage 28.

It is also possible to connect auxiliary chambers to the trapped volume 36 without utilizing the outlet passage 55 as a conduit. For example, the intake port pressure control system 20 can include a crankcase passage 72 extending between the crankcase 24, which constitutes the auxiliary chamber, and an additional bypass port 76 formed in the intake passage 32 between the intake valve 26 and check valve 34. The crankcase passage 72 enables communication between the crankcase 24 and trapped volume 36. Connected to the crankcase passage 72 is a crankcase valve 74 which includes means for controlling the flow area of the crankcase passage 72.

While the connection between the crankcase 24 and trapped volume 36 is shown separate from the control valve means 54, the crankcase could be connected to the control valve means in a similar fashion as the plenum 40 and exhaust passage 28. The control valve means 54 would then include means for controlling the flow area of the flowpath between the crankcase 24 and trapped volume 36. Each of these modes of connecting the crankcase 24 to the trapped volume 36 can be used with a conventional positive crankcase ventilation system.

Another example of an auxiliary chamber which does not require the outlet passage 55 as a conduit would be a high-pressure air source, such as a supercharger or air pump, connected to the bypass port 76 to supply secondary air to the trapped volume 36. The high-pressure air source can include means for controlling the flow area of its outlet passage leading to the bypass port 76 or a controller to regulate the outlet pressure of the air source. The high-pressure air source also allows provision of air to the trapped volume 36 even if the pressure therein is higher than atmospheric.

Figure 6:
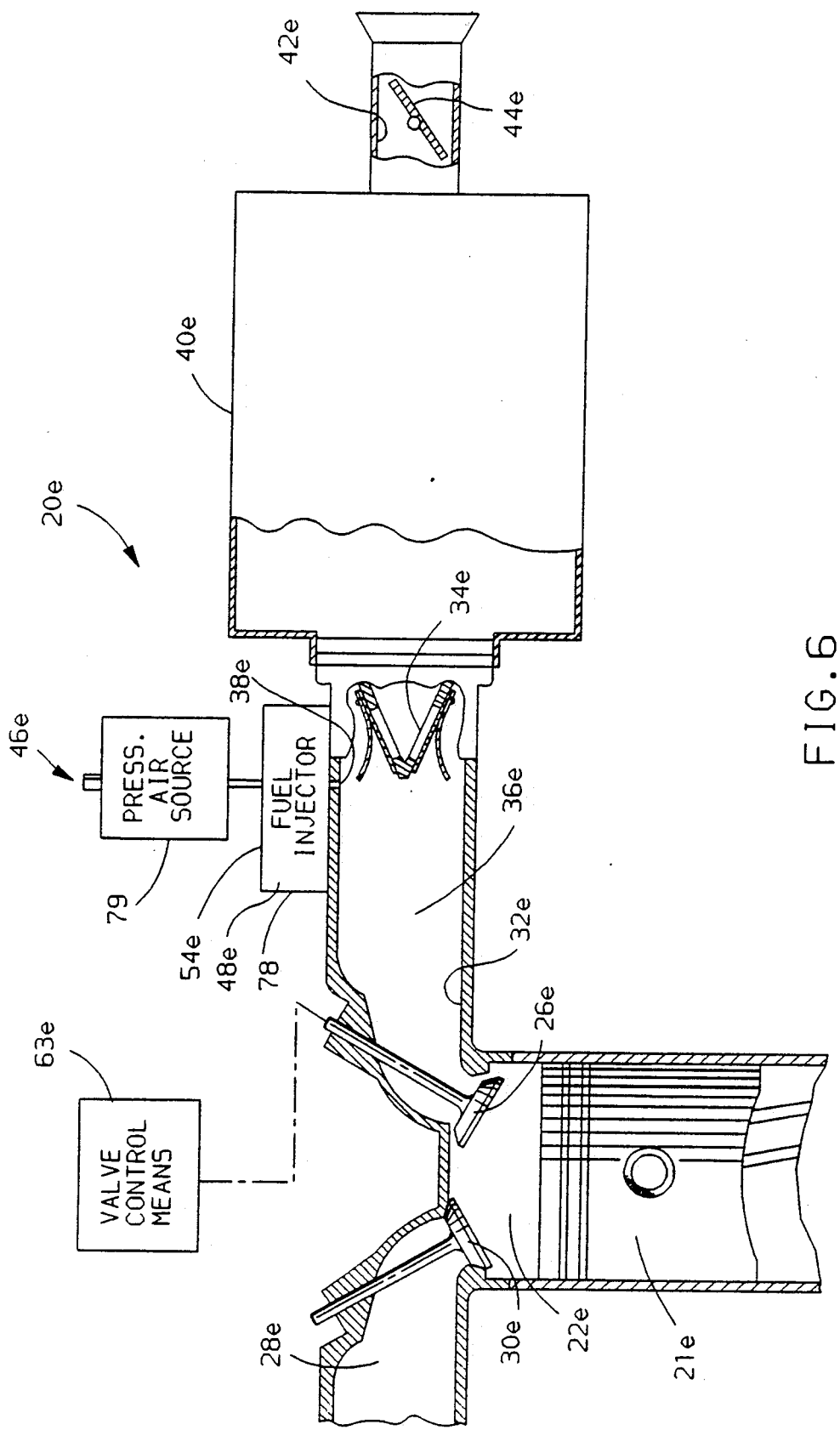
FIG. 6 is a schematic view showing an alternative embodiment of the invention wherein an air assist fuel injector is connected to the bypass port.

Secondary air can also be provided to the trapped volume 36e using an alternative embodiment of the intake port pressure control system 20e shown in FIG. 6. Parts similar to those shown in FIG. 1 have the same reference numeral with the addition of the suffix e. An air assist fuel injector 78 is connected to the bypass port 38e and a high-pressure air source 79 is connected to the fuel injector. The air assist fuel injector 78 can independently control the air and fuel flow therethrough into the trapped volume 36e. The air assist fuel injector 78 can improve fuel atomization and mixing.

Control Valves

Figure 7:
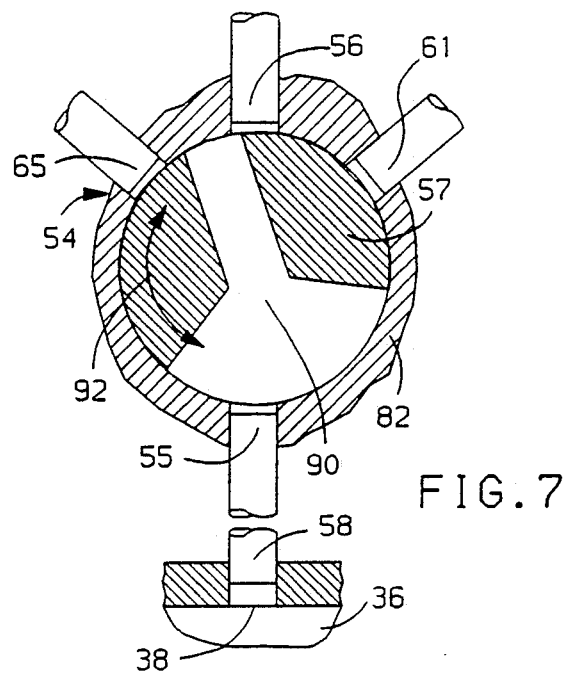
FIG. 7 is a schematic view showing details of a portion of the control valve means of FIG. 1.

One possible embodiment for a portion of the control valve means 54 is shown in FIG. 7. The control valve means 54 includes a housing 82 containing the actuating means 57, outlet passage 55 and secondary passage 56. The actuating means 57 comprises a rotary actuator having a valve passage 90 which can be aligned with the secondary passage 56 and outlet passage 55 to allow communication therebetween. Rotation of the actuating means 57, indicated by arrow 92, causes variation of the flow area of the flowpath between the secondary passage 56 and outlet passage 55. The rotation of the actuating means 57 can be controlled by an electronic control module for the engine.

The housing 82 can also contain the auxiliary passage 61 which can communicate with the outlet passage 55 by rotating the actuating means 57 to align the valve passage 90 with the auxiliary passage 61 and outlet passage 55. Rotation of the actuating means 57, indicated by arrow 92, causes variation of the flow area of the flowpath between the auxiliary passage 61 and outlet passage 55.

The housing 82 can also contain the auxiliary passage 65 which can communicate with the outlet passage 55 by rotating the actuating means 57 to align the valve passage 90 with the auxiliary passage and outlet passage. Rotation of the actuating means 57 causes variation of the flow area of the flowpath between the auxiliary passage 65 and outlet passage 55.

In a multi-cylinder engine, two or more of the respective housings 82 can be axially aligned enabling two or more of the respective actuating means 57 to be formed from a single member which extends through the respective housings.

Figure 8:
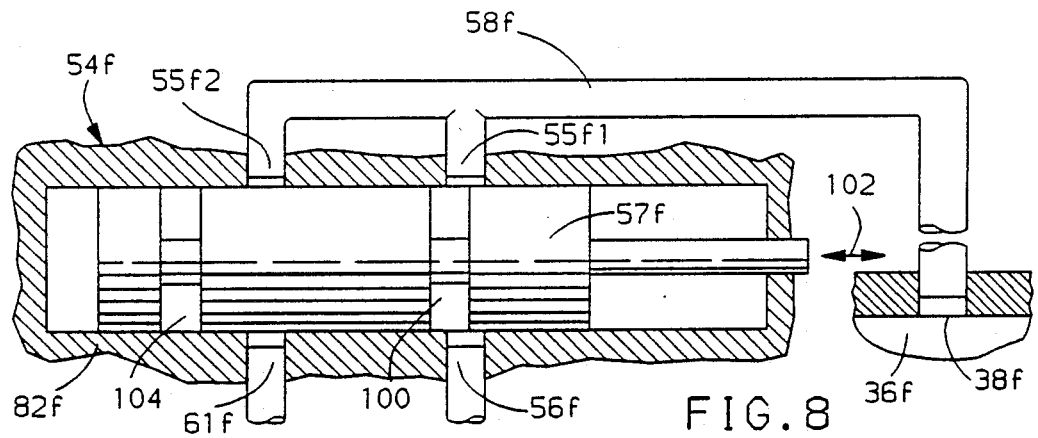
FIG. 8 is a schematic view of a portion of an alternative embodiment of the control valve means.

An alternative embodiment for a portion of the control valve means 54f is shown in FIG. 8. Parts similar to those shown in FIG. 1 have the same reference numeral with the addition of the suffix f. The control valve means 54f includes a housing 82f containing the actuating means 57f, secondary passage 56f and an outlet passage 55/1 axially aligned therewith. The actuating means 57f comprises a plunger having a valve passage 100 which can be aligned with the secondary passage 56f and outlet passage 55/1 to allow communication therebetween. The housing 82f can further include an auxiliary passage 61f and outlet passage 55/2 axially aligned therewith. The actuating means 57f can include a valve passage 104 which can be aligned with the auxiliary passage 61f and outlet passage 55/2 to allow communication therebetween. Linear displacement of the actuating means 57f, indicated by arrow 102 causes variation of the flow area of the flowpath between secondary passage 56f and outlet passage 55/1, and between the auxiliary passage 61f and outlet passage 55/2. The displacement of the linear actuator 57f can be controlled by an electronic control module for the engine.

In a multi-cylinder engine, two or more respective housings 82f can be axially aligned enabling two or more of the respective actuating means 57f to be formed from a single member which extends through the respective housings.

In a multi-cylinder engine similar to that shown in FIG. 5, the individual control valve means 54d may be replaced by an alternative embodiment of the control valve means 54f shown in FIG. 8. In this embodiment, additional outlet passages 55/1 extending to the respective trapped volumes 36f are connected to the housing 82f along a perimeter thereof which includes the secondary passage 56f so that the outlet passages and secondary passage are each tangent to a common radial plane perpendicular to the longitudinal axis of the actuating means 57f. This enables communication between the outlet passages 55/1 and a single secondary passage 56f, via the valve passage 100. Axial displacement of the actuating means 57f causes variation of the flow area of the outlet passages 55/1. Additional outlet passages 55/2 leading to the respective trapped volumes 36f can also be attached to the housing 82f in a similar manner as the additional outlet passages 55/1. The width of the secondary passage 56f is at least as large as the combined width of one of the outlet passages 55/1 and the valve passage 100. Adjustment of the flow area of the outlet passages 55/1 does not, therefore, affect the communication between the valve passage 100 and secondary passage 56f. The auxiliary passage 61f can be sized in relation to the outlet passages 55/2 and the valve passage 104 in a similar manner as the secondary passage 56f.

Figure 9:
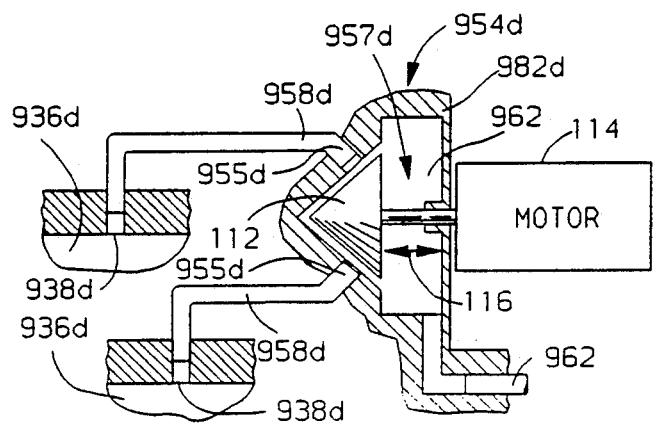
FIG. 9 is a schematic view of a portion of an alternative embodiment of the control valve means.

In a multi-cylinder engine similar to that shown in FIG. 5, the individual control valve means 54d may be replaced by the single control valve means 954d shown in FIG. 9. Parts similar to those shown in FIG. 5 have the same reference numeral with the addition of the prefix 900. The control valve means 954d includes a housing 982d containing the actuating means 957d, outlet passages 955d and secondary passage means 962. The actuating means 957d comprises a wedge-shaped head 112 connected to a motor 114 which causes displacement of the head with respect to the outlet passages 955d, as shown by arrow 116. The motor 114 can be controlled by an electronic control module for the engine.

Displacement of the head 112, as shown by arrow 116, adjusts the flow area of the flowpath between the secondary passage means 962 and the outlet passages 955d. Adjustment of the flow area of the outlet passages 955d does not affect the communication between the portion of the secondary passage means 962 contained in the housing 982d, and the secondary air source.

Other control valve means can be used to actively adjust the flow area of the flowpath between the secondary passage 56 and outlet passage 55, and to control the flow area of the flowpath between the auxiliary passages 61, 65 and outlet passage. Such control valve means include a solenoid controlled valve, an on/off valve and a stepper motor activated controlled orifice. Such control valve means can also include a check valve located in the secondary passage 56, auxiliary passages 61, 65, or outlet passage 55.

Operation

Referring now to FIG. 1, the intake port pressure control system 20 is operated by modulating the actuating means 57 to actively adjust the flow area of the flowpath between the secondary passage 56 and outlet passage 55 so that it has the optimum size for the operating condition of the engine. This enables a controlled air flow from the secondary air source 46 through the control valve means 54 into the trapped volume 36 to increase the pressure therein when the intake valve 26 is closed.

In some cases, the pressure in the trapped volume 36 is below atmospheric so that secondary air can flow into the trapped volume, via the control valve means 54, from the throttle passage 42 or from the ambient air surrounding the engine. The secondary air flow can be controlled by actively adjusting the actuating means 57. If the pressure in the trapped volume 36 becomes higher than atmospheric, as can occur, for example, by the intake valve 26 remaining open during compression in the cylinder 22, then the secondary air source may have to be a high pressure air source or an air assist fuel injector 78, as shown in FIG. 5.

The idle speed of the engine can be controlled using the intake port pressure control system 20, as shown in FIG. 1. This can be accomplished by closing the throttle valve 44 to limit the air flow through the check valve 34. The actuating means 57 is then opened to allow secondary air to flow to the cylinder 22, via the secondary passage 56 and outlet passages 55, and the trapped volume 36. The secondary air flow can be regulated by modulating the actuating means 57 to actively adjust the flow area of the flowpath between the secondary passage 56 and outlet passage 55.

The intake port pressure control system 20 can be modified to control the amount of residual exhaust gas which is used to control combustion in the cylinder 22. The modifications required include connecting a valve control means 63, such as a camshaft, connected to the intake valve 26. The valve control means 63 is adapted to cause the intake valve 26 to be open during a portion of the engine cycle when the exhaust valve 30 is open. During some engine operating conditions, the simultaneous opening of the intake and exhaust valves 26, 30 can result in increased levels of exhaust gas in the cylinder 22 and the trapped volume 36. During other engine operating conditions, the simultaneous opening of the intake and exhaust valves 26, 30 can facilitate discharge of exhaust gas from the cylinder 22 to the exhaust passage 28.

The residual exhaust gas used to control combustion in the cylinder 22 is controlled by controlling the flow area of the flowpath between the secondary passage 56 and outlet passage 55 to control the pressure in the trapped volume 36. The pressure in the trapped volume 36 affects the amount of residual exhaust gas which remains in the cylinder 22, and which flows from the cylinder back into the trapped volume 36. The residual exhaust gas which flows into the trapped volume 36 later reenters the cylinder 22 during the next intake of air into the cylinder.

It is possible to sufficiently reduce the pressure in the trapped volume 36 so that a substantial amount of residual exhaust gas can flow into it from the cylinder 22. If the amount of such residual exhaust gas and the residual exhaust gas which remains in the cylinder 22 is sufficient, then the external exhaust gas recirculation (EGR) system could be eliminated. Controlling the flow area of the flowpath between the auxiliary passage 61 and outlet passage 55 can also produce low pressures in the trapped volume 36 since the auxiliary passage 61 is connected to the plenum 40.

Controlling the flow area of the flowpath between the auxiliary passage 61 and outlet passage 55, and actively adjusting the flow area between the secondary passage 56 and outlet passage 55, can result in a wide range of pressure control in the trapped volume 36 due to the difference between the pressures in the secondary passage and auxiliary passage. This enables further control of the residual exhaust gas which remains in the cylinder 22 and which flows from the cylinder back into the trapped volume 36.

External EGR can also be regulated by controlling the flow area of the flowpath between the auxiliary passage 65 and outlet passage 55. External EGR can also be regulated if an actuating means 57 is used which enables communication between the auxiliary passages 61, 65 enabling exhaust gas to flow from the exhaust passage 28 into the plenum 40 and be carried to the cylinder 22 by the air flowing through the plenum and check valve 34. It is also possible to ventilate the crankcase 24 to the trapped volume 36 via the crankcase passage 72 and valve 74.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An intake port pressure control system comprising:
   an intake passage leading to a cylinder in an engine;
   a check valve in said intake passage allowing fluid flow toward the cylinder and obstructing fluid back-flow in the reverse direction;
   an intake valve seated in said intake passage between said check valve and the cylinder;
   a bypass port located on said intake passage so that said bypass port communicates with a trapped volume defined by the portion of said intake passage between said check valve and said intake valve; and
   a control valve means having an outlet passage, a secondary passage, and an actuating means enabling communication between said outlet passage and said secondary passage, said actuating means further enabling active adjustment of the flow area of the flowpath between said secondary passage and outlet passage throughout a range of engine operating conditions, said outlet passage being connected to said bypass port enabling communication between said outlet passage and trapped volume, said secondary passage being connected to a secondary air source allowing communication therebetween, said control valve means enabling a controlled air flow through it between the secondary air source and said trapped volume when said intake valve is closed.

2. An intake port pressure control system as set forth in claim 1 in combination with a secondary air source comprising a throttle passage having a throttle valve therein, said secondary passage being connected to said throttle passage adjacent said throttle valve and between said throttle valve and the inlet to said throttle passage, said connection being located so that when said throttle valve is closed, the portion of said throttle passage with which said secondary passage communicates has generally the same pressure as the inlet of said throttle passage, and when said throttle valve is partially open, the portion of said throttle passage with which said secondary passage communicates has generally the same pressure as the outlet of said throttle passage.

3. An intake port pressure control system as set forth in claim 1 wherein the engine includes an auxiliary chamber and said control valve means has an auxiliary passage, said actuating means enabling communication between said outlet passage and auxiliary passage, said actuating means further enabling control of the flow area of the flowpath between said auxiliary passage and outlet passage, said auxiliary passage being connected to the auxiliary chamber enabling communication therebetween.

4. An intake port pressure control system for an engine having a plurality of cylinders wherein the intake of air into at least two of the cylinders occurs during different portions of the engine cycle, the intake port pressure control system comprising:
an intake passage leading to each cylinder;
a check valve in each of said intake passages to allow fluid flow toward the respective cylinder and obstruct fluid back-flow in the reverse direction;
an intake valve seated in each of said intake passages between said check valve and the cylinder;
a bypass port located on each of said intake passages so that each of said bypass ports communicates with one of said respective trapped volumes defined by the portion of each of said intake passages between the respective one of said check valves and said intake valves; and
a control valve means having an outlet passage connected to each of said bypass ports enabling communication between said outlet passage and the respective one of said trapped volumes, a secondary passage means connected to a secondary air source enabling communication therebetween, and an actuating means enabling communication between said outlet passages and said secondary passage means, said actuating means further enabling individual control of the flow area of each flowpath between said secondary passage means and each of said outlet passages.

5. A method for controlling the idle speed of an engine having an intake passage leading to a cylinder, a check valve in the intake passage to allow fluid flow toward the cylinder and obstruct fluid back-flow in the reverse direction, an intake valve seated in the intake passage between the check valve and cylinder, a bypass port located on the intake passage so that the bypass port communicates with a trapped volume defined by the portion of the intake passage between the check valve and said intake valve, a control valve means having an outlet passage, a secondary passage, and an actuating means enabling communication between the outlet passage and secondary passage, the actuating means further enabling active adjustment of the flow area of the flowpath between the secondary passage and outlet passage throughout a range of engine operating conditions, the outlet passage being connected to the bypass port enabling communication between the outlet passage and trapped volume, the secondary passage being connected to a secondary air source enabling communication therebetween, and a throttle valve upstream of the check valve, the method comprising
setting the throttle valve to limit the air flow through the check valve, and
modulating the actuating means to actively adjust the flow area of the flowpath to allow a sufficient amount of air to enter the cylinder, via the control valve means and trapped volume, to produce an acceptable idle speed of the engine.

6. A method for controlling the residual exhaust gas in the cylinder of an engine having an intake passage leading to the cylinder, a check valve in the intake passage to allow fluid flow toward the cylinder and obstruct fluid back-flow in the reverse direction, an intake valve seated in the intake passage between the check valve and cylinder, a bypass port located on the intake passage so that the bypass port communicates with a trapped volume defined by the portion of the intake passage between the check valve and said intake valve, a valve control means connected to the intake valve, the valve control means being adapted to cause the intake valve to be open during a portion of the engine cycle when an exhaust valve for the cylinder is open, a control valve means having an outlet passage, a secondary passage, and an actuating means enabling communication between the outlet passage and secondary passage, the actuating means further enabling control of the flow area of the flowpath between the secondary passage and outlet passage, the outlet passage being connected to the bypass port enabling communication between the outlet passage and trapped volume, the secondary passage being connected to a secondary fluid source enabling communication therebetween, the method comprising
controlling the flow area of the flowpath to control the pressure in the trapped volume so that, during the portion of the engine cycle when both the intake and exhaust valves are open, sufficient residual exhaust gas can remain in the cylinder, and can flow from the cylinder back into the trapped volume and reenter the cylinder during the next intake of air into the cylinder, to provide an adequate amount of exhaust gas to the cylinder to control combustion therein.

* * * * *